Nov. 26, 1968  E. L. ROBINSON  3,413,408
ELECTRIC CABLE FOR HIGH TEMPERATURE OPERATION
Filed Aug. 15, 1967
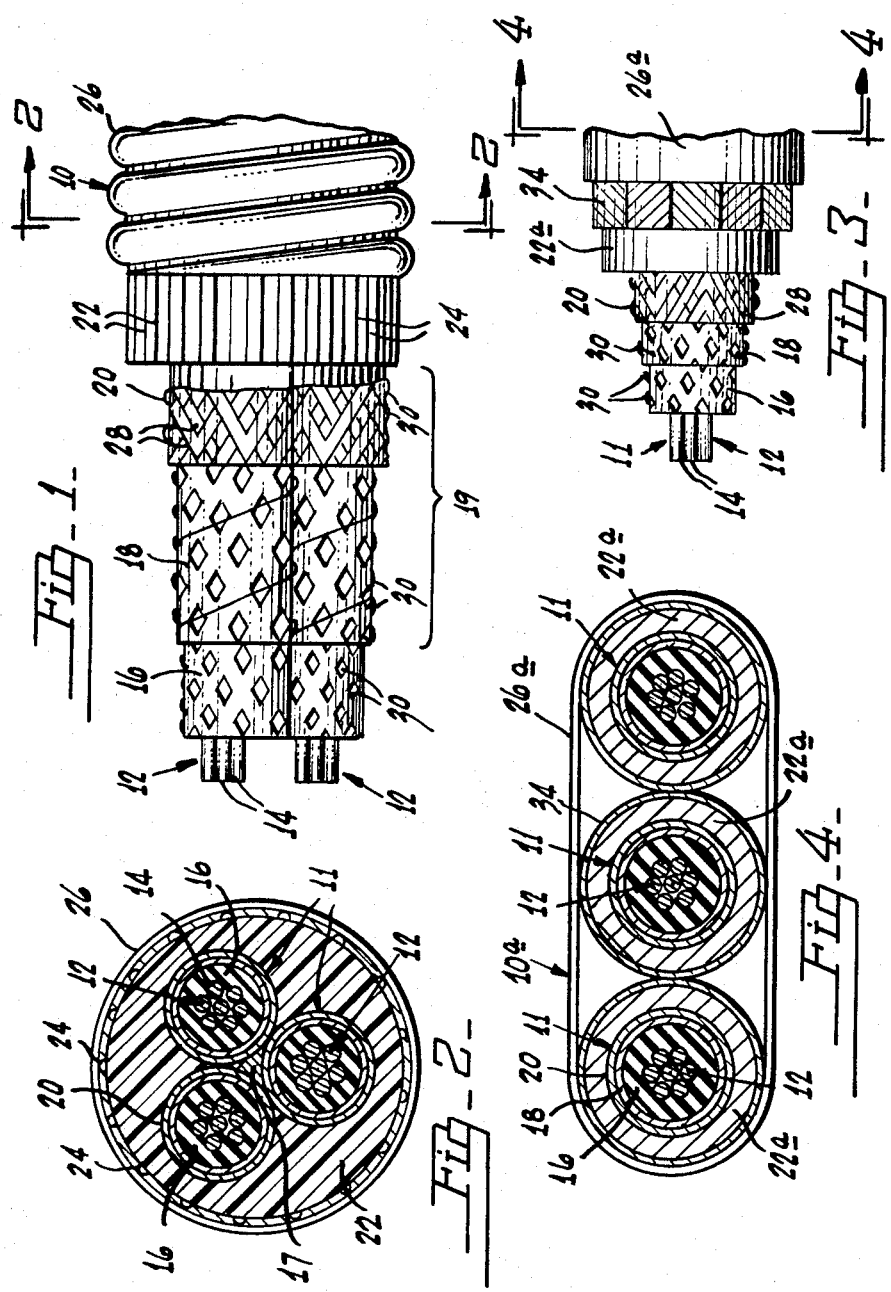
INVENTOR
EDMUND L. ROBINSON
BY Sperry and Zode
ATTORNEYS United States Patent Office 3,413,408
Patented Nov. 26, 1968

3,413,408
ELECTRIC CABLE FOR HIGH TEMPERATURE
OPERATION
Edmund L. Robinson, Morrisville, Pa., assignor to Crescent Insulated Wire & Cable Company, Trenton, N.J., a corporation of New Jersey
Filed Aug. 15, 1967, Ser. No. 660,738
10 Claims. (Cl. 174—121)

ABSTRACT OF THE DISCLOSURE

A mechanically strong, radially expansible barrier impervious to liquid and gaseous contaminants, interposed between the jacket and electrical insulation of cable subject to high heat conditions. An inner covering of polyvinyl fluoride tape is wrapped about the insulation and is enclosed by a braided, continuous filament glass fiber outer covering. The inner covering stretches upon expansion of the insulation under high heat conditions, but remains impervious to the liquid and gaseous contaminants. The outer covering is stable and non-deteriorating under such conditions to mechanically reinforce the insulation, and has interstices into which the inner covering and insulation expand without loss of the barrier and reinforcement characteristics.

Background of invention

*Field of the invention.*—The invention pertains to the manufacture of a plural layer type of insulated and jacketed electrical cable, in which are embodied one or more laminations of a plastic material, whether in fibrous or sheet form, or a combination thereof. The invention essentially comprises a barrier, one layer of which is expansible with insulatoin enclosed thereby, in the presence of high heat, while retaining a characteristic of imperviousness to liquid and gaseous contaminants. A second lamination is of braided form, in which interstices appear between adjacent strands of the braid, so that the fluid-impervious inner covering may expand into the interstices in the form of small domes without, however, rupturing.

*Description of the prior art.*—Heavy duty electric cables of the character described herein generally employ two or more insulated conductors in a jacket resistant to penetration by contaminant fluids such as oil, gas and water. Cables of this general construction are used, for example, in oil well casings, to feed power downhole to submerged electric motors driving multi-state centrifugal pumps.

A common form of such cable comprises a plurality of conductors each having an insulation, generally a thermosetting, rubber-like material, a cross-linked polyethylene, or a thermoplastic insulation such as a polyethylene or polypropylene, or vinyl. The insulated conductors are cabled together with the center interstice filled with a rubber-like filler material, and are then enclosed in an oil-, gas-, and water-resistant, nitrile-base jacket material. A flexible, interlocked, galvanized steel or Monel armor is then applied overall for additional mechanical protection.

Cables of this construction have given satisfactory service where the temperatures encountered in the well or by the cable in the well annulus above the liquid being pumped does not reach relatively high temperatures (over 220° F.).

For operation at higher temperatures, the addition of a close, high temperature, nylon braid coated with nylon lacquer over each conductor insulation, provides additional mechanical protection to the insulation, which is quite soft at the elevated temperature, and acts as a barrier to the contamination of the insulation by liquids and gases that may work through the nitrile jacket.

The rate of thermal expansion of the insulating materials is several times greater than the rate of expansion of the metal conductor encased therein. Hence, the nylon braid noted above was used because of its strength, and its ability to stretch as the conductor insulation expanded. However, the constrution covered by the present invention results in a superior resistance to deterioration when subjected to long-time high temperature operation, as compared with the nylon-lacquered nylon braid construction.

This has been the general state of the prior art, so far as is known to me, and the present invention is proposed to improve upon cable operation at high temperatures over a long period of time.

Summary of the invention

Basically, the invention comprises interposition of a barrier between the conventional nitrile jacket and the insulation that surrounds the metal conductors. While in a broad sense it is not unknown to provide barriers, as for example nylon braid as discussed above, the present invention comprises a barrier that combines high mechanical strength with a full imperviousness to the penetration of the insulation by the noted liquid and gaseous contaminants.

To this end, the invention, summarized briefly, incorporates the use of a continuous filament glass fiber braid, having the dual characteristics of great mechanical strength and stability at high temperatures, over a spirally wrapped and overlapped polyvinyl fluoride tape that extends about each conductor insulation. More than one tape may be used, in either buttlapped or overlapped construction. Approximately 50% coverage is provided by the glass braid. Percent of braid coverage is a well known feature in the cable industry and is defined in Underwriters' Laboratories standards.

This spacing defines interstices occurring freely and substantially uniformly over the full elngth and circumference of the braid, into which the polyvinyl fluoride tape expands with the insulation. The insulation and the tape enclosing it expand into said interstices in the form of small domes, since the high heat and the resultant thermal expansion of the insulation generate substantial internal pressures. The interstices thus off relief areas into which the insulation may expand, but at the same time, there is no appreciable expansion or stretching of the continuous filament glass fiber, braided outer covering. This gives the desired objective of mechanical reinforcement of the insulation, while at the same time, the polyvinyl fluoride tape barrier is preserved in its impervious state, to prevent penetration of the insulation by gas, oil, or other contaminating fluids.

The glass braid, also has the desirable characteristics of not deteriorating on exposure to high temperature conditions, as distinguisshed from nylon, cotton, Dracon, or other yarns that might be used or have been heretofore suggested.

Brief description of the drawing

FIGURE 1 is a fragmentary side elevational view of a length of cable, according to the present invention, of the type in which three insulated conductors are enclosed in a common jacket, the cable layers being successively stripped away to show the construction thereof;

FIGURE 2 is a cross-sectional view through the cable, substantially on line 2—2 of FIGURE 1;

FIGURE 3 is a view similar to FIGURE 1, showing a different type of cable, wherein each insulated conductor is enclosed within its own, individual jacket; and FIGURE 4 is a cross-sectional view substantially on line 4—4 of FIGURE 3.

Description of the preferred embodiments

The cable construction shown in FIGURES 1 and 2 has been generally designated 10. In this form of the invention, three conductors 12 have been shown by way of example, triangularly arranged as shown in FIGURE 2, with each conductor comprising a plurality of spirally related strands of copper, aluminum, or other suitable electrically conductive material. The conductors, if formed of a number of strands, have the interstices within the stranded conductors filled with a rubber-like or other suitable filler to prevent "wicking" or passage of liquid or gases longitudinally through the conductor. The strands or elements have been designated 14, and as seen from FIGURE 2, each conductor so formed is embedded within electrical insulation 16, which in a typical cable construction would be, as shown, a thermosetting rubber material, a cross-linked polyethylene, or a thermoplastic insulation such as polyethylene, polypropylene, or vinyl. In either event, such material has excellent electrically insulative qualities, but typically tends to soften and expand to a substantial extent in the presence of the relatively high temperatures hereinbefore referred to.

The cable construction shown in FIGURES 1 and 2 is such that each conductor 12 has its own surrounding coating of insulation 16. In this connection, if the conductor or conductors 12 are enclosed within a rubber-like insulation, it is conventional practice to apply a protective layer of tin or a lead alloy over the soft copper of the solid or stranded conductor. This is not illustrated, being a well-known expedient employed in the manufacture of cables of this type. It is also well known to fill the central cavity occurring between the several insulated conductors 11 with a suitable filler material 17.

As a next step in manufacturing the cable, and in accordance with the present invention, a length of polyvinyl fluoride tape is applied about the insulation 16 of each insulated conductor 11. This provides an inner covering 18 of a barrier 19 of laminate form constituting the improvement herein described and claimed.

Application of inner covering 18 proceeds by spirally wrapping the polyvinyl fluoride tape found to produce optimum results about insulation 16, the overlap being between 25% and 50%.

The next step in manufacturing the cable may now be carried out, and comprises application of an outer covering 20 thereto.

Outer covering 20 of barrier 19 is of continuous filament glass fiber material, and is applied in the form of a relatively open braid, to which is applied, preferably, a coating of nylon lacquer 21. This assists in protecting the braid during subsequent manufacturing operations, such as cabling and jacketing.

In the cable construction shown in FIGURES 1 and 2, the next manufacturing step is to apply a jacket 22 common to all three conductors 11. Jacket 22, in the preferred embodiment, is of nitrile base construction, this being a construction well known in the art. A jacket having a nitrile base has the characteristic of being resistant to penetration by oil, gas, water, or other contaminant fluids. It may be observed at this point, however, that the jacket is not completely impervious to the passage of such fluids, and this lack of complete imperviousness to contaminants is an important reason for provision of the improved barrier 19 constituting the present invention.

The jacket, also in accordance with regular practice, may be provided at uniformly angularly spaced intervals about its circumference, with longitudinal splines 24. These are designed to permit thermal expansion due to high temperature operation of the jacketed cable, into the inner surface of the interlocked metal armor sheath 26 extending about the jacket 22.

The characteristics of the barrier 19 are of importance.

As shown in FIGURE 1, the outer covering is provided with interstices 28, resulting from provision of an open (as distinguished from a closed) braid. These interstices are thus uniformly spaced both longitudinally and circumferentially of the outer covering. In a preferred embodiment, an open braid, providing approximately 50% coverage of the conductor, is used, so that the interstices define relief areas into which the insulation 16, enclosed within inner covering 18, may expand when said insulation softens and expands radially under high temperature conditions. The percentage of braid coverage of the insulation will vary where different thicknesses of insulation are used, because the increase in the insulation volumetric area will exceed the increase in the area of the outside of the insulated conductor and hence will require larger interstices to provide for thermal expansion.

In these circumstances, the expansion of the insulation 16 forces said insulation outwardly into interstices 28, so that the insulation and inner covering are caused to have small domes 30.

The number, spacing, and size of interstices 28 is selected to permit expansion of the inner covering 18 and insulation 16 under the highest temperature conditions that occur during the high temperature vulcanization of the jacket and that may be expected in regular use of the cable.

Referring to the form of the invention shown in FIGURES 3 and 4, essentially there is no difference from the first form so far as the improvement constituting the present invention is concerned. FIGURES 3 and 4 merely show the adaptability of the invention for use in cables of other types, as for example a cable in which each conductor 12 is encased not only within its own insulation 16, but also within its own jacket 22a.

Thus, in manufacture of the table 10a, tape 18 is applied about insulation 16, to provide the inner covering as shown in FIGURE 1, and thereafter, the braided outer covering 20 is applied, again in the same manner as shown in FIGURE 1.

In the modified form, however, instead of a jacket 22 common to all of the several insulated conductors, a separate jacket 22a is applied to each insulated conductor, extending about the braided outer covering 20 thereof. The material of the jacket is the same as in the first form of the invention. Thereafter, in this form there may be applied, to each jacket, a protective surfacing 34 in the form of a nylon-lacquered, nylon braid. Finally, extending about the parallel, side-by-side conductors, is a metal armor sheath 26a.

So far as the inventive improvements are concerned, there is no difference from the first form, that is, outer covering 20 has interstices 28 into which insulation 16 and its protective inner covering 18 are radially expansible in the presence of high heat.

Other cable forms are equally well adapted for application of the inventive improvements thereto, and in every instance, there would be interposed, between the expansible insulation 16 and the jacket 22, a barrier 19 comprising an inner covering 18 and an outer covering 20.

It will be noted that importantly, the invention combines a mechanical reinforcement with an imperviousness to the passage of liquid and gaseous contaminants, along with a capability of being preserved against deterioration in the presence of high temperatures. To this end, it will be seen that the outer covering is stable at the high temperatures hereinbefore referred to occurring over extended periods of time. Thus, the outer covering not only will not deteriorate when exposed to high temperature operation, but also, gives the desired result of reinforcing the insulation 16 mechanically when the insulation becomes soft and expands, both during the high temperature jacket vulcanizing cycle occurring during manufacture and also in use in hot locations or under heavy electrical loading.

At the same time, penetration of insulation 16 by fluid contaminants that may have worked their way through the jacket 22 or 22a, is prevented by the inner covering. The inner covering, as distinguished from the outer covering, provides for expansion in the presence of the high heat, as defined previously herein and this is in fact desired, since the insulation must have room to expand, and since the covering 18 extending thereabout should be free to expand with the insulation without, however, rupturing to permit the flow of the fluid contaminants into the material of the insulation 16. Inner cover 18 merely expands in the form of small domes, into the interstices 28 which are intentionally provided in the outer covering, whereby the expansion is permitted without rupture of the inner covering, and without loss of the mechanical reinforcement afforded by the outer covering 20.

In practice, it has been found that a cable formed as described and illustrated herein, has distinctly improved operating characteristics, when used under high temperature conditions, such as when feeding power into a deep hole in oil well operations.

Tape materials other than polyvinyl fluoride preferred in the illustrated and described embodiment may be employed, so long as they possess the characteristics of flexibility, stretchability, and imperviousness and longtime stability at the mentioned relatively high temperatures in the presence of oil, gas, water and other contaminants. Such materials might, for example be polytetrafluoroethylene or fluorinated ethylene propylene.

I claim:
1. In electric cable for use under high temperature conditions, said cable including at least one conductor encased in electrical insulation of a type subject to expansion in the presence of high heat, and additionally including a jacket enclosing said insulation and formed of a material resistant to penetration by fluid contaminants, an improved barrier between the jacket and insulation comprising:
   (a) an inner covering extending about the insulation, said inner covering being of a material the characteristics of which include stretchability in a direction radially of the cable by the expanded insulation and imperviousness, both in its stretched and unstretched conditions, to the passage of fluid contaminants; and
   (b) an outer covering extending about the insulation and inner covering as a mechanical reinforcement therefor and formed of a material having distinctly less stretchability than the inner covering in said radial direction, said outer covering having interstices providing relief areas into which the insulation and inner covering are free to expand, under high heat conditions, without rupture of the inner covering.

2. In electric cable, a barrier as in claim 1 wherein the comparative stretchability of the inner and outer coverings is such that the outer covering remains stable, in the presence of heat of a value productive of expansion of the insulation and resultant stretching of the inner covering.

3. In electric cable, a barrier as in claim 1 wherein the interstices in the outer covering are spaced apart in a substantially uniform pattern through the circumference of the cable.

4. In electric cable, a barrier as in claim 1 wherein the inner covering comprises a lapped tape.

5. In electric cable, a barrier as in claim 1 wherein the material of the inner covering is polyvinyl fluoride.

6. In electric cable, a barrier as in claim 1 wherein the outer covering is a braid.

7. In electric cable, a barrier as in claim 1 wherein the outer covering is formed of a glass fiber material.

8. In electric cable, a barrier as in claim 1 wherein the outer covering is a braid the members of which are separated to define said interstices.

9. In elastic cable, a barrier as in claim 1 in which the outer covering comprises intersecting members of glass fiber material, adjacent members being spaced apart to the extent of providing approximately 50% coverage of the conductor surface area to define said interstices.

10. In electric cable, a barrier as in claim 1 wherein the outer covering comprises an open braid formed of continuous filament glass fiber yarn.

References Cited
UNITED STATES PATENTS

| 1,863,147 | 6/1932 | Young | 174—121 |
| 2,260,761 | 10/1941 | Wilkoff | 174—121 |

LEWIS H. MYERS, *Primary Examiner.*

ELLIOTT A. GOLDBERG, *Assistant Examiner.*